United States Patent

[11] 3,607,741

[72] Inventor Alfred Sohnius
2 Elmhurst Road, Baltimore, Md. 21210
[21] Appl. No. 12,685
[22] Filed Feb. 19, 1970
[45] Patented Sept. 21, 1971
Continuation-in-part of application Ser. No. 808,023, Mar. 17, 1969, now abandoned.

[54] OIL SLICK REMOVAL SYSTEM
10 Claims, 8 Drawing Figs.
[52] U.S. Cl. .................................................. 210/36,
210/40, 210/242, 210/484, 210/504, 210/505,
210/DIG. 21
[51] Int. Cl. .................................................. E02b 15/04,
B01d 39/04
[50] Field of Search .......................................... 210/36, 39,
40, 242, 484, 496, 504, 505, 510, DIG. 21

[56] References Cited
UNITED STATES PATENTS

| | | | |
|---|---|---|---|
| 2,367,384 | 1/1945 | Tymstra et al. | 210/DIG. 21 |
| 2,399,158 | 4/1946 | Armaly | 210/484 |
| 2,568,144 | 9/1951 | Cremer et al. | 210/504 X |
| 2,708,982 | 5/1955 | McGuff et al. | 210/505 X |
| 3,069,017 | 12/1962 | Colby | 210/505 X |
| 3,238,056 | 3/1966 | Pall et al. | 210/505 X |
| 3,382,170 | 5/1968 | Pape | 210/36 |

Primary Examiner—Samih N. Zaharna
Attorney—John F. McClellan, Sr

ABSTRACT: Physical means for removing oil slicks from water and other surfaces utilizing chemically treated cellulosic bulk material contained in encasements of netting. The chemically treated material is hydrophobic but exhibits an affinity for oil. Oil thus gathered can be reclaimed.

PATENTED SEP 21 1971  3,607,741

INVENTOR
ALFRED SOHNIUS
BY John F. McClellan
ATTORNEY

OIL SLICK REMOVAL SYSTEM

This application is a continuation-in-part of my copending application Ser. No. 808,023 filed Mar. 17,1969 for "Physical and Chemical Gathering And Removal Of Oil Slicks," which application is now abandoned.

This invention relates generally to combined physical and chemical gathering systems for removal of unwanted material, and specifically to a system for removing oil from the surface of water and the like.

Property damage and decimation of wildlife and marine life due to oil slicks is a growing problem. Offshore drilling, shipwrecks and harbor pollution spew vast quantities of oil into our waters. In the past, the problem has been combated in several ways which have proven less than satisfactory. Chemical detergents and surface active agents have been used to disperse slicks, but they only spread the oil over a greater area and so create a worse condition. Such chemicals are themselves pollutants and kill microscopic marine life and fish. Physical means for gathering the oil such as skimming are not presently practical to cope with large quantities of oil, particularly in the open and rough sea. Past attempts at surrounding and containing oil have met with the same objection. Straw has been used to gather the oil, but is largely ineffective because the oil adheres to the straw only because of surface tension. Even when crushed, straw exhibits little capillary action and negligible absorption.

The present invention employs physical gathering materials which exhibit an affinity for oil but which are chemically treated to render them at the same time hydrophobic.

An object of this invention is to provide a system for gathering oil for physical removal from water for salvage of the oil in original, unadulterated form, or for removal and disposal of the oil by burning if salvage is not an object.

Another object of this invention is to provide a system for protecting beaches, harbors, and other specific areas from oil slick damage.

A further object of this invention is to provide a material, made from constituents which are very widely available, for gathering pollutants on beaches, streets, in swamps, or other land or water surfaces so as to eliminate contamination and fire hazard.

These objects are accomplished through provision, in typical embodiment, of a unitary mass of pieces of finely divided, oil absorptive and adsorptive cellulosic material having integral air cells for flotation, resilient fiber content to prevent compaction of the mass, water repellent interspersed throughout to prevent water saturation of the mass, and exterior netting to maintain coherence of the mass.

Other objects and further advantages of the invention will become apparent upon examination of the following description, and of the drawings in which:

Taking up the Figures in detail:

FIG. 1 is a magnified view of the basic structure of this invention. It consists of a cohesive aggregation of air-containing pulp-walled cells 12, reinforced by interspersed fibers 14, the whole treated with water repellent material not indicated on the drawing.

Figure 1:
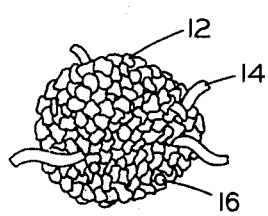
FIG. 1 is a detail of the minute structure of the material of this invention.

In the preferred embodiment the pulp used is paper stock such as newspapers, and the fiber is wood chips or excelsior. The individual fibers are relatively long, the average fiber passing through a large number of cells. In manufacture, the paper stock is wetted, mixed with emulsifier and water-repelling agents, beaten to a pulpy froth by a high-speed stirrer, mixed with the fiber which has also been treated with water repellent, and dried in 4-to-6 inch diameter individual pieces, for convenience or any other sizes for particular purposes. The dry weight proportion of the combined pulp and fiber is in the range of 75% to 95% pulp. Product efficiency drops off substantially if the range is exceeded, with loss of gathering capacity on the low-percentage side, and loss of strength and resiliency on the high-percentage side.

Cellulosic material in general has good affinity for oil. The resultant great surface area provided by the finely divided material prepared according to this invention has relatively enormous oil absorbing and adsorbing capacity in relation to the weight of material used. Additionally, the material so prepared resists crushing and matting, and will float in water for usefully long periods without becoming water saturated. As will be seen, it is particularly useful for the apparatus of this invention to float high in the water for long periods.

The water repellent used has been found to afford to a surprising degree the required combination of waterproofing of the finely divided cellulosic material without decreasing the oil gathering capacity of the material. For this purpose the following materials are used in the proportions listed, in one embodiment of the invention:

Percent of total weight of repellent as applied

|  | Preferred percent | Range, percent | Combined percentage |
| --- | --- | --- | --- |
| Silicone | 10 | 20–0 | 60 |
| Paraffin | 50 | 40–60 | |
| Stearate | 30 | 0–30 | 40 |
| Emulsifier | 10 | 2–10 | |

Silicone antiwetting agents such as the dimethyl silicone fluids, of which the dimethyl polysiloxanes are examples, are preferred because they provided relatively long flotation, but they are also relatively expensive. Above 20% and below 2% of the combined weights given above, they afford relatively little improvement.

Paraffin is cheap, widely available, and very effective for the purposes noted. The stearate used can be any of several metallic stearates, or a mixture, but calcium stearate is preferred as being of low toxicity to marine life on decomposition. The stearates render the material of this invention somewhat more attractive to oil, under the conditions of use of the material.

Emulsifier, preferably oil-soluble emulsifier, is used in amount necessary to form the required structure of the cellulosic material in manufacture, but in less amount than would render the material hydrophilic. An evaporative-type emulsifier permits best control of the process and most economical manufacture. Alkyl aryl polyether alcohol, or 3, 5-dimethyl-1-hexyn-3-ol have been found satisfactory for the purpose, in the percentage range noted above.

A more economical, and under some conditions of use an equally satisfactory water repellent for the uses of this invention is composed of paraffin and the above emulsifier alone, in the relative-weight range of 90% to 98% paraffin. Depending on the type oil in a spill, efficiency of the material of this invention may be lower because of reduction of the formulation to the two ingredients.

In either case, the proportion of water repellent by weight as applied is 0.5% to 5% of the combined dry weight of pulp and fiber. Less than this proportion allows too-rapid waterlogging of the mass, and more than this proportion does not appreciably improve the oil-gathering capacity.

The resultant oil-gathering material prepared and waterproofed according to this invention is strikingly efficient. Tests have demonstrated that a given quantity of the material will absorb 6.6 times its weight in oil. It is believed that this efficiency is unparalleled in the present state of the art.

Shown also in FIG. 1 are small spherical shells 16. These are optional. They can be used to add extra flotation where there is requirement for extremely long float periods. These minute shells can be of urea formaldehyde, phenolic resins, or any other suitable plastic which will have the strength to withstand the high-speed beating of the cellulosic material during manufacture.

Figure 2:
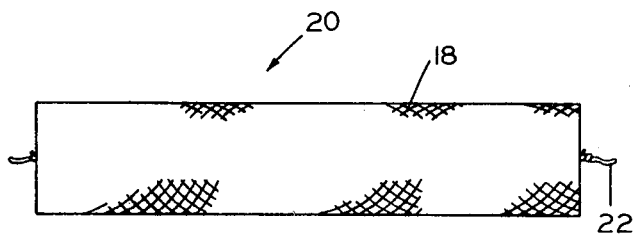
FIG. 2 is an elevation of the overall shape of an element of this invention.

FIG. 2 shows a mass of the oil absorbent material of this invention gathered and retained by netting 18, as an element 20 having a cylindrical configuration. The cylindrical shape shown in FIG. 2 offers unique advantages, as will be seen.

The netting exposes the retained material and the interfaces between the pieces of material for oil gathering while retaining coherence of the mass and providing for easy retrieval by grapnel. Metal netting, which may be of galvanized or of vinyl-clad iron wire, is preferred if fire may be present, to avoid release of the oil-gathering material by burning of the netting. For use in other applications, plastic netting may be used, such as polypropylene or any other plastic which provides strength, resilience, resistance to deterioration, and easy disposal by incineration.

A quick attachment means such as a swiveled french snap 22 is provided at one or both ends of the cylindrical element, so that plural elements can be assembled when required, as in FIGS. 4–6 to which reference is made later.

Figure 3:
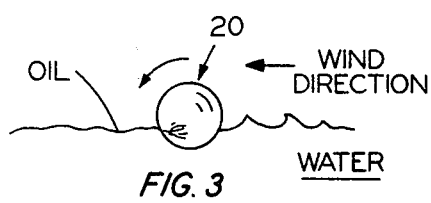
FIG. 3 is an end view of the FIG. 2 element in use removing oil from water.

FIG. 3 shows the element of FIG. 2 is use at sea gathering oil. The element has been placed upwind from the oil slick. It is sailing into the oil, broadside to the wind in accordance with the natural tendency of elongated shapes. It can be seen that with proper conditions the cylinder can roll as it proceeds, progressively presenting fresh surfaces to the oil.

Figure 4:
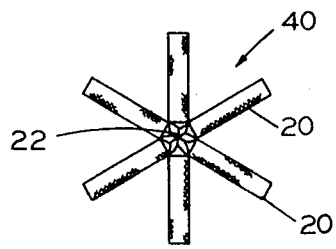
FIG. 4 is a plan view of an array of the FIG. 2 elements.

FIG. 4 shows a star-shaped array 40 of elements 20 like that of FIGS. 2 and 3. These are joined elements can roll, adding to the oil gathering efficiency of the array.

Figure 5:
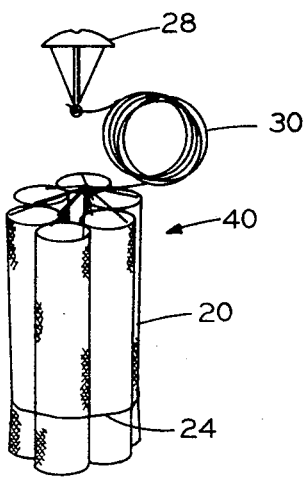
FIG. 5 is a perspective view of the FIG. 4 array in stored position.

FIG. 5 depicts the FIG. 4 array in storage with the elements 20 gathered parallel and retained in twine 24. When the twine is cut, elasticity of the elements will deploy them to the FIG. 4 position as they are thrown onto the surface of the oil.

A sea-anchor or drogue 28, preferably of light metal or plastic as shown, stowed in the top of the array 40 prior to deployment, and connected to the center of the assembly by a line 30, can be used to anchor the array in an oil spill, maintaining maximum exposure for gathering oil.

Figure 6:
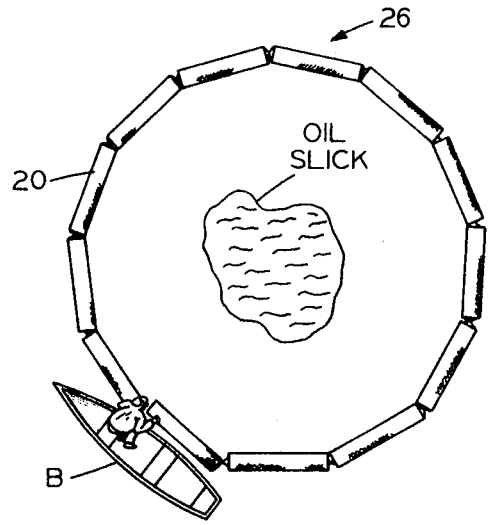
FIG. 6 is a perspective view of a further array of the FIG. 2 elements.

FIG. 6 indicates the ease and speed with which a small boat B can be used to corral, as at 26, a heavy spill of oil which would otherwise quickly spread over and pollute a large area. Because of the light weight of elements 20, large numbers can be carried by relatively small craft, and handled safely without assistance, even in rough weather.

Figure 7:
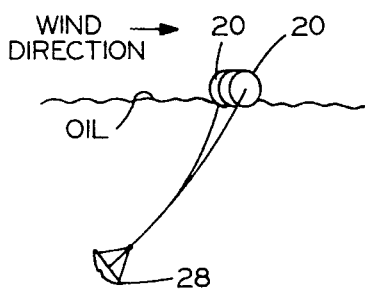
FIG. 7 is a view similar to that of FIG. 2 showing the use of an optional arrangement of this invention.

FIG. 7 depicts another arrangement using the previously mentioned sea-anchor 28. When one or more of the elements 20 are positioned as a linear barrier to intercept oil carried by wind or tide, as in preventing oil from reaching a beach, such an anchor is useful to restrain the elements 20 from drifting ahead of the oil slick. In shallow water the sea-anchor, if of the rigid metallic type, acts as an ordinary mushroom anchor, holding in the bottom.

The sea-anchor is preferably yoked to both ends as shown, giving the effect of attachment intermediate the length, so that the barrier is not drawn end-on to the oil by the anchor.

Figure 8:
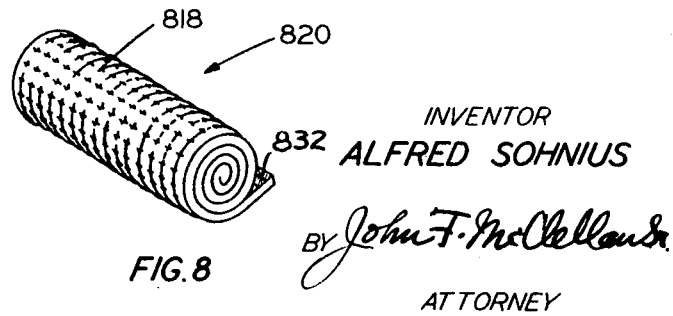
FIG. 8 is a perspective view of a roll of matting made according to this invention.

FIG. 8 shows a roll of flat matting provided according to this invention for carriage by fire department general emergency vehicles, for use principally on land to sop up petroleum-product spills. The matting is quilted together in any required size by a network 818, which may be wire network to provide maximum resilience, and is quickly and easily deployed onto a spill by unrolling.

After elements made according to this invention have gathered oil from the polluted area, they can be pressed to reclaim the oil in its original form. The exhausted elements can then be used for fuel.

Optionally, the elements can be burned without reclamation of the oil. In any case, water treated according to this invention is in no way contaminated by the system, but is speedily and efficiently rid of floating oil contaminants.

A further feature of the FIG. 8 embodiment is indicated at 832. This is a nonabsorptive plastic or metallic coating or sheeting applied to and entirely covering one broad surface of the matting 820, which upon unrolling is the upper surface of the matting. The nonabsorptive coating acts as a barrier to prevent capillary action from drawing up and releasing, as fumes, spilled gasoline, kerosene, or the like, thus effectively smothering any frame present, and in any case reducing frame possibilities. Such mats can also be thrown on floating gasoline fires. The nonabsorptive membrane used can be polyethylene or any other flame resistant material such as aluminum foil.

Obviously many modifications and variations of the present invention are possible in light of the above teachings. It is, therefore, to be understood that within the scope of the appended claims the invention may be practiced otherwise than as specifically described.

I claim:

1. A system for oil slick removal from water surfaces and the like, comprising: a unitary conglomerate of free-floating oil-gathering means, said oil-gathering means including cellulosic mass means having therein means for rendering said cellulosic mass means hydrophobic while preserving the oil gathering quality thereof, and means for containing the cellulosic mass means; wherein the cellulosic mass means includes an aggregate of air-containing cellulose-pulp-walled chambers and a plurality of resilient cellulose fibers interspersed through said aggregate, the average length of fibers being substantially greater than the average dimension across said chambers, and wherein the means for rendering the cellulosic mass means hydrophobic comprises water repellent commingled with coating all said walls and fibers.

2. A system for oil slick removal as recited in claim 1, wherein oil-gathering means has substantially cylindrical exterior shape.

3. A system for oil slick removal as recited in claim 2, wherein the means for containing the cellulosic mass means comprises a netting.

4. A system for oil slick removal as recited in claim 3, comprising a plurality of said oil-gathering cylinders, one end of all cylinders being pivotally attached proximately to a central point, and anchor means depending from said central point.

5. A system for oil slick removal as recited in claim 3 wherein the netting is metallic, thereby preventing the cellulosic mass means from being released to disperse when afire.

6. A system for oil slick removal as recited in claim 2, and a plurality of watertight air-containing spherical shells interspersed throughout said cellulosic mass means.

7. A system for oil slick removal as recited in claim 2 wherein the oil-gathering means is in the shape of flat matting, thereby being adapted for storage by rolling and deployment onto said oil by unrolling.

8. A system for oil slick removal as recited in claim 7 wherein one broad surface of the flat matting is covered with a nonabsorptive membrane.

9. A system for oil slick removal from water surfaces and the like, comprising: a unitary cylindrically shaped conglomerate of free-floating oil-gathering means, said oil-gathering means including cellulosic mass means comprising an aggregate of air-containing pulp-walled chambers and a plurality of resilient fibers interspersed through said aggregate, the average length of the fibers being substantially greater than the average dimension across said chambers; means for containing the cellulosic mass means; means for rendering the cellulosic mass means hydrophobic, comprising water repellent commingled with and coating all said pulp walls and fibers; and anchor means effectively attached medianly the length of said cylinder.

10. A process of oil slick removal from water surfaces and the like, comprising the steps:

a. preparing a free-floating oil absorbing cellulosic mass means having resilient-fiber-reinforced pulp-walled air chambers therein, with water repellent commingled with and coating all said pulp walls and fibers;
b. constraining said cellulosic mass means in cylindrical form by means of netting;
c. floating said cylindrically formed cellulosic mass means upon a said surface in contact with the oil thereon;
d. removing the oil-contacted cylindrically formed cellulosic mass means from said surface, thereby removing the oil slick from the water surface.